United States Patent Office 3,699,050
Patented Oct. 17, 1972

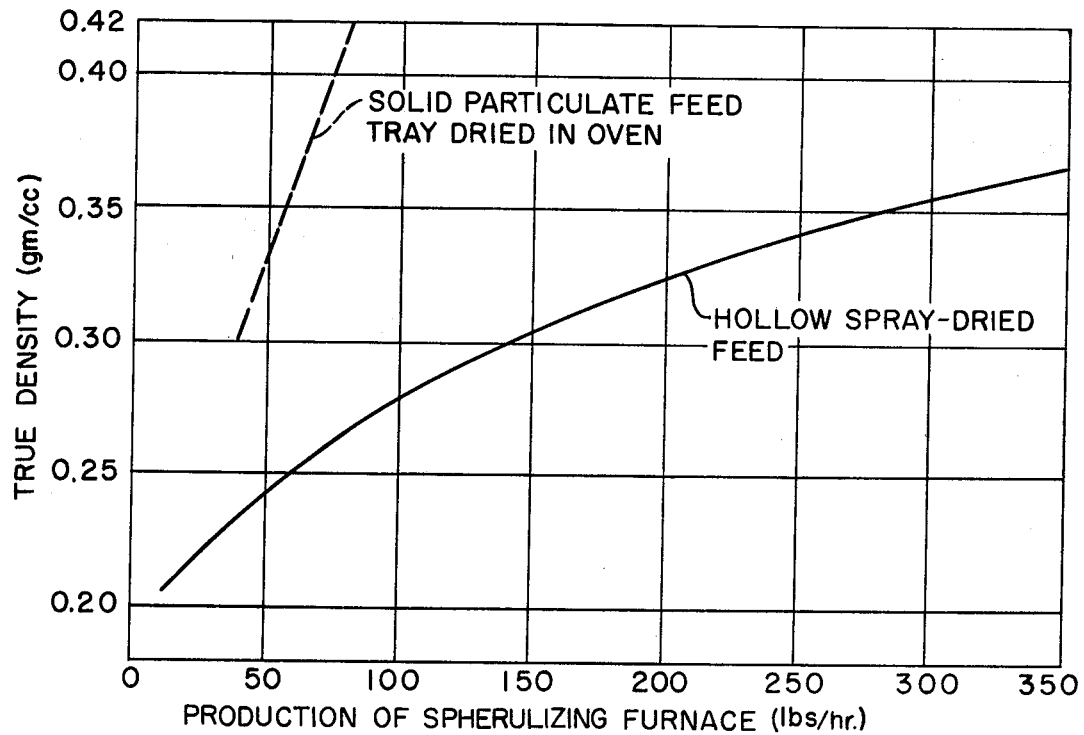

3,699,050
SPRAY DRIED PRODUCT FOR FEED IN THE MANUFACTURE OF HOLLOW GLASS SPHERES AND PROCESS FOR FORMING SAID SPRAY DRIED PRODUCT
Craig Henderson, Clarkson, Ontario, Canada, assignor to Emerson & Cuming, Inc., Canton, Mass.
Filed Aug. 2, 1967, Ser. No. 657,865
Int. Cl. B01j 13/00
U.S. Cl. 252—317            6 Claims

ABSTRACT OF THE DISCLOSURE

The instant application relates to a product formed by the spray drying of an alkali borosilicate sol, which product is subsequently utilized as feed to a spherulizing furnace which produces hollow glass spheres of a diameter in a range from about 5 to 5000 microns.

BACKGROUND OF INVENTION

This invention relates to the preparation of a spray dried product which is used as feed in a spherulizing furnace which operates in the range of from about 1000 to about 2000° F. and which results in the formation of hollow glass spheres.

More particularly, the instant process relates to a spray dried particulate feed material for the commercial production of hollow, spherical, unitary discrete glass spheres. The product of the instant invention may be made in any desired size range which is generally chosen consistent with a predetermined correlation to the size of the hollow glass spheres desired.

Previously, hollow glass spheres were made from solid, particulate material which was produced by reacting an alkali metal silicate with an aqueous slurry of boric acid, or with solid finely ground boric acid. The reaction product was an alkali metal borosilicate which formed a gel. This mixture, preferably with a gasifying or blowing agent added, was dried in a forced circulation air convection oven at a temperature in a range from about 500° F. to about 900° F. in a batch operation by spooning the gel into shallow trays. Upon drying, a major portion of the blowing agent escaped from the mixture leaving a dried cake which was laboriously pounded out of the trays and the chunks of cake were then pulverized and screened to obtain the desired size range of solid, particulate material which was then fed to a spherulizing furnace. Such a process for the production of a particulate, solid feed material and various embodiments of a spherulizing furnace is described in U.S. Pats. Nos. 2,978,339; 3,129,086 and 3,230,064.

A further improvement to the aforesaid process comprised the use of a continuous forced circulation drying oven in which the trays were placed on a moving belt, which trays after having been subjected to hot air convection drying were also subjected to infrared radiation. The advantage of this drying operation was the shortening of the drying cycle, though the vexatious problem of coercing the cake from the pans was in no way diminished.

A still further improvement in the drying operation is disclosed in U.S. patent application Ser. No. 562,738 now abandoned which comprises pouring the gel, preferably after it has been reduced to a relatively fluid state (which state would allow it to be termed properly a sol) onto an endless metallic belt at a temperature within the range of about 600° F. to about 830° F., which belt progressed continuously through a forced air circulation oven. The cake which formed on the belt did not adhere to the metallic surface and was easily parted from the belt after which it was pulverized and screened as before. This improvement obviated the necessity of manually pounding the cake from the trays.

It should be noted that dried, borosilicate cake as produced by the above-mentioned reaction is extremely friable, that is, when pulverized it breaks up into mainly large chunks and extremely fine particles; the chunks are too large for the spherulizing furnace and the fine particles are too small for forming a salable hollow sphere. The chunks being too large have to be pulverized further, which in turn gives a disproportionate number of very fine particles too small for profitable use in the spherulizing furnace. It might be redundant to state that to separate, by sieving, a desirable size range of particles useful in the spherulizing process, an inordinate amount of dust is necessarily produced, which dust is extremely aggravating and inflammatory both to the eyes and the lungs.

There was reason to believe that the drying operation, in combination with size reduction could be accomplished in a single unit operation. It was even conjectured, ideally, that with a particular combination of apparatus and process conditions, it might even be possible to control the size range of the solid particles formed in said drying operation so they would be in the desired size range and thus to avoid a subsequent sieving operation.

The advantage of being able to produce the correct size range of feed material in a single unit operation would solve the problems of three separate unit operations, namely drying, size reduction and screening, at the same time effect proportionate savings in operating costs.

A logical choice for a unit operation which would solve these problems was a spray drying process. However, it should be noted that the alkali borosilicate sol (which may also be called a solution just as commercially available sodium silicate solution is called a solution) is an aqueous solution of a glassy material (not a glass as is evidenced by X-ray analysis). In general, aqueous solutions of materials such as soap, gelatin and water-soluble polymers, which form a tough, tenuous outer skin on drying, will form hollow spheres with substantially discontinuous skins when spray dried. This is attributed to the formation in the spray drying tower of a case-hardened skin which prevents liquid from the drops from reaching the surface of the particle from the interior. Because of high heat transfer rates, liquid retained at the center of the particle vaporizes causing the actual shell to expand and form a sphere.

In aqueous solutions the heat transfer rate is usually sufficient to blow a hole through the walls of many of the hollow spheres causing the dried particles to have ruptured or discontinuous skins. Hollow particles, with discontinuous skins are called "shells" and form the bulk of the spray dried product. A small proportion of the spray dried product results in discrete spheres where the rate of build-up of vapor pressure of the liquid in the center was insufficient to blow a hole through the wall. A small proportion results in substantially spherical particles with continuous or discontinuous walls, or both, forming agglomerates. A very small proportion of the dried particles are substantially solid spheres of high density and like proportion consists of speres of low density, with continuous skins but multicellular, hollow interiors (a plurality of such hollow spheres is called "foam") still other particles which are formed are fragmented portions of the above-identified particles including agglomerates of one another, and agglomerates of mixtures of one with the other.

Sodium silicate solutions, like other alkali silicate solutions, can be spray dried. For example, sodium silicate solution, which has been spray dried to particle sizes smaller than 100 mesh with a moisture content of 17 percent by weight, may be purchased commercially from Philadelphia Quartz as Sodium Silicate G. The particles in such a product generally tend to be predominantly composed of unicellular shells, that is, substantially spherical discrete particles which have had the walls blown out in one or more spots.

In the production of hollow glass particles with gas-containing interiors and continuous skins, it is necessary to provide a blowing agent within the feed particle which blowing agent, in the hot environment of the spherulizing furnace, provides an expanding force which gives shape to the molten particle.

In U.S. Pat. 2,797,201, Example 10 discloses that a 10 percent solution of sodium silicate, with a blowing agent, was spray dried. The resulting product consisted of particles with continuous hole-free walls (except for 2 percent which sank in water). It was apparent, since the blowing agent had already been decomposed and the spray-dried particles were already gas-filled spheres, that subjecting these particles to the intense heat of a spherulizing furnace, to transform it into a glass particle, would serve only to collapse the spheres.

It was hoped that, if a blowing agent were selected such that an effective quantity sufficient to form spheres in the spherulizing furnace were retained within the continuous skins of spheres of spray dried sol, a spherulized hollow product with a continuous skin would be formed in the furnace. Experiments along this line were discouraging. Products obtained with feeding spherical hollow particles with continuous skins to the spherulizing furnace resulted in blistered, deformed and collapsed product of an unacceptably high density. Therefore it was conjectured that it would be essential to feed solid particles containing a blowing agent to the spherulizing furnace to make hollow glass spheres with continuous skins.

Early experiments appeared to confirm this conclusion as they indicated a correlation between the percent of solid particles in the spray dried product and the percent of unit hollow spheres with continuous, smooth skins. Therefore it was assumed that a solid particle with occluded blowing agent was required to form the unit hollow glass sphere which was the desired product.

It might be noted at this point that the raw materials used in the production of the early spray dried material were commercial sodium silicate solutions and finely divided boric acid either in solid form or in a slurry of finely ground particles in water; the reaction product was a non-homogeneous gel, the viscosity of which increased rapidly upon standing. Subsequently a process was discovered for converting the same commercially available solutions into a homogeneous gel which then could be converted to a homogeneous sol, the viscosity of which would not change upon standing and the sol was stable for extended periods of time. The process for making such a homogeneous sol, is disclosed in copending U.S. application Ser. No. 557,359 now abandoned.

It was discovered, quit surprisingly, that the sol described in U.S. patent application Ser. No. 557,359 now abandoned could be spray dried to form a particulate product, mostly of multicellular shells, which nevertheless gave unit, discrete, hollow glass spheres with smooth skins. A further characteristic of the multicellular product is that it can be formed in a size range which can be correlated to the size range of unit, discrete, unicellular glass spheres formed in the spherulizing furnace, thus eliminating the distasteful and inconvenient sieving operation. Still more surprisingly, it was discovered that the shells obtained by spray drying the sol could be fed to a conventional spherulizing furnace at twice the throughput of the solid, particulate feed material made by previous drying processes, thus yield at least twice as much and sometimes five times as much product. In addition, it is much easier to control and maintain the true density of the hollow glass spheres in the low region (0.24 to 0.36 gm./cc.) using spray dried feed than it is to maintain low density of the glass spheres using particulate solid dried feed. The density requirement is of paramount importance where the hollow spheres are used as a low density, high strength filler for various resin containing lightweight formulations.

SUMMARY

The instant invention relates to aspray dried alkali metal borosilicate product which is transformed into discrete hollow glass spheres.

More particularly, the instant application relates to a hollow particulate alkali metal borosilicate product substantially all the particles of which have discontinuous skins (referred to as "shells"), with a predominant number of the shells being attached to at least one other particle (such a combination is referred to as a multicellular particle).

An object of the instant invention is to produce a predominantly multicellular, substantially hollow, particulate alkali metal borosilicate product by spray drying a homogeneous akali metal borosilicate sol combined with a blowing agent.

Another object of the instant invention is to provide a spray dried product comprising an alkali metal borosilicate and a blowing agent, said product being transformed into discrete, unit hollow glass spheres with continuous skins when said product is fed to a spherulizing furnace.

A further object of the instant invention is to double the production of a spherulizing furnace operating with a conventional, solid, discrete particulate feed by feeding the same furnace with spray dried, hollow, predominantly multicellular particles with discontinuous skins.

Another object of the instant invention is to produce a spray dried alkali metal borosilicate product with a moisture content controlled within the range of 1–5 percent by weight, which product is useful in the production of hollow glass spheres.

A still further object of the instant invention is to provide a process which in a single step provides a discrete dried alkali metal borosilicate particle in a predetermined size range with a predetermined quantity of blowing agent included therein which avoids oven drying of the reaction product, separately grinding and pulverizing said oven-dried product, and further avoids sieving the reaction product for particles in the desired size range.

DESCRIPTION OF THE PREFERRED EMBODIMENT

The product of the instant invention is preferably made in a mixed-current spray dryer, also called a co-current counter-current dryer. Other forms of spray dryers may be used, such as a co-current dryer or a counter-current dryer. Shape of the drying chamber will depend on the type of dryer chosen and the dimensions of the dryer will be predicated by the characteristics of the liquid feed to the dryer and the drying capacity desired.

The drying medium is air heated by a direct type gas-fired air heater. Other gases may be used such as nitrogen, carbon dioxide, etc., provided that they are relatively inert with respect to the feed material to be dried. Ambient air is blown in through a duct which enters the enlarged upper portion of a conically shaped drying chamber, the apex of which points downwards.

A preferred feed is a homogeneous solution of the alkali metal borosilicate comprising a blowing agent. A preferred manner of compounding the feed is disclosed in copending application Ser. No. 557,359, now abandoned. A water content in the range of 70 to 95 percent is preferred. Quantities of water outside the preferred range may be used except that it is uneconomical to dry very dilute sols, and sols with too high a solids content are difficult to atomize.

Feed material from a feed storage tank is pumped out under pressure to an atomizing nozzle. Relatively high pressure pumps are preferred for making the smaller particles while a larger spray dried particle may be formed by spraying at a lower pressure. In general other features of dryer operation will influence the size of the feed more than the pressure of the pump.

After the feed material is atomized it comes in contact with the hot air. Both the hot air and the atomized feed pass down to the bottom of the dryer cone in a co-current spiral path adjacent to the walls of the cone. In the bottom of the drying chamber cone, the hot air flow is reversed in direction and passes up through the center of the drying chamber. The product, due to the change in direction of the dry medium, separates out of the air stream and is discharged into a pneumatic conveying system. The product is conveyed to an air cyclone separator, from which it is discharged through a rotary valve into suitable containers. Air for the pneumatic conveying system passes from the separator into the lower portion of the drying chamber cone. The return of the conveying air to the drying chamber assures that any product entrained in the conveying air leaving the cyclone separator is not lost from the system.

The accompanying graph illustrates a comparison of production rates using a conventionally dried, solid particulate feed to a spherulizing furnace, and the spray-dried predominantly multicellular feed of the instant invention. In each case the spherulizing furnace was operated to make a hollow glass particle of predetermined true density at maximum capacity. It will be seen that, for any particular density, the spherulizing furnace will make at least more than three times as much product with the spray-dried feed, and nearly five times as much at higher densities.

It was not possible to make a hollow glass spherical product of true density greater than 0.37 gm./cc. with the partciular spray-dried feed used in the comparison runs. However, higher densities may be made with spray-dried feed if appropriate variations in drying conditions and liquid feed specifications are made.

The following table lists a comparison of production rates for each feed at chosen true densities:

TABLE I

| Example number | True density, gm./cc. | Production rate, lbs./hr. Solid particulate feed tray-dried in oven | Production rate, lbs./hr. Multicellular hollow spray-dried feed |
|---|---|---|---|
| 1 | 0.302 | 38 | 143 |
| 2 | 0.324 | 47 | 196 |
| 3 | 0.340 | 53 | 245 |
| 4 | 0.360 | 59 | 312 |
| 5 | 0.368 | 62 | 350 |

Examples 6–8 list typical dryer operating conditions for making spray-dried feed. It will be apparent to one skilled in the art that the physical characteristics of the spray-dried feed may be modified by appropriate changes in the operation of the dryer and liquid feed material.

TABLE II

| Example number | Liquid feed to dryer, lbs./hr. | Solids in feed, lbs./hr. | Pump pressure, p.s.i.g. | Air Temp., ° F. Inlet | Air Temp., ° F. Outlet | Air volume, c.f.m.×10³ | Product, lbs./hr. | Percent yield solids basis | Bulk density, gm./cc. | Particle size, mesh −60+325 (percent) | Particle size, mesh −325 (percent) | Percent moisture |
|---|---|---|---|---|---|---|---|---|---|---|---|---|
| 6 | 3,317 | 653 | 2,800 | 660 | 480 | 16.2 | 514 | 78.5 | 0.24 | 78.6 | 21.4 | 3.49 |
| 7 | 3,276 | 648 | 2,900 | 670 | 460 | 16.5 | 494 | 76.2 | 0.21 | 81.9 | 18.1 | 3.98 |
| 8 | 3,350 | 664 | 3,000 | 650 | 450 | 16.3 | 507 | 76.1 | 0.23 | 88.7 | 11.3 | 4.72 |

I claim:

1. A process for forming a feed material from which can be formed hollow, fused glass spheres at high temperatures which comprises:
   (a) spraying into a drying chamber a composition comprising a blowing agent and a homogeneous sol, said sol obtained by reacting an aqueous alkali metal silicate solution and a boron containing acid to form a gel and thereafter contemporaneously heating and agitating the gel to form the sol,
   (b) simultaneously introducing a hot gas at a temperature in excess of 200° F., into said drying chamber, and
   (c) recovering from said chamber dried, substantially hollow, spherical particles having discontinuous skins, said particles being predominantly multicellular.

2. The process of claim 1 wherein the sol is a sodium borosilicate sol comprising from about 5 to about 30% solids, and wherein said hot gas is air.

3. The process of claim 1 wherein the homogeneous sol comprises the reaction product of sodium silicate solution having a $SiO_2/NaO_2$ ratio of about 3.2:1, and boric acid solution, and the solids content of the sol is in the range of about 15 to 30 weight percent.

4. The process of claim 2 wherein the air is introduced into the drying chamber at a temperature within the range of 500–700° F. and the air temperature at the outlet of the drying chamber is in the range of 375–475° F.

5. A mass of solid substantially hollow, spherical particles with discontinuous skins suitable for forming hollow glass spherical particles when heated at the fusion temperature of said hollow particles, said hollow spherical particles being predominantly multicellular shells and comprising a homogeneous mixture of a blowing agent and the dried product of a homogeneous sol comprising the reaction product of an aqueous alkali metal silicate solution and a boron containing acid.

6. The product of claim 5 wherein the particles have a bulk density within the range of about 0.1 to about 0.4 gram per cubic centimeter.

References Cited

UNITED STATES PATENTS

| | | | |
|---|---|---|---|
| 2,630,410 | 3/1953 | Clapsadle et al. | 252—313 |
| 2,978,340 | 4/1961 | Veatch et al. | 106—75 X |
| 3,383,172 | 5/1968 | Biegler et al. | 23—182 |

RICHARD D. LOVERING, Primary Examiner

U.S. Cl. X.R.

65—21, 142; 106—40 V, 75; 252—313 S

UNITED STATES PATENT OFFICE
CERTIFICATE OF CORRECTION

Patent No. 3,699,050   Dated October 17, 1972

Inventor(s) Craig Henderson

It is certified that error appears in the above-identified patent and that said Letters Patent are hereby corrected as shown below:

In the Specification, page 12, Table II, last Column under "Percent moisture", should read as follows:

Second item - 3.92 -

Third item - 4.78 -

Signed and sealed this 6th day of March 1973.

(SEAL)
Attest

EDWARD M. FLETCHER, JR.
Attesting Officer

ROBERT GOTTSCHALK
Commissioner of Patents